United States Patent Office 2,957,667
Patented Oct. 25, 1960

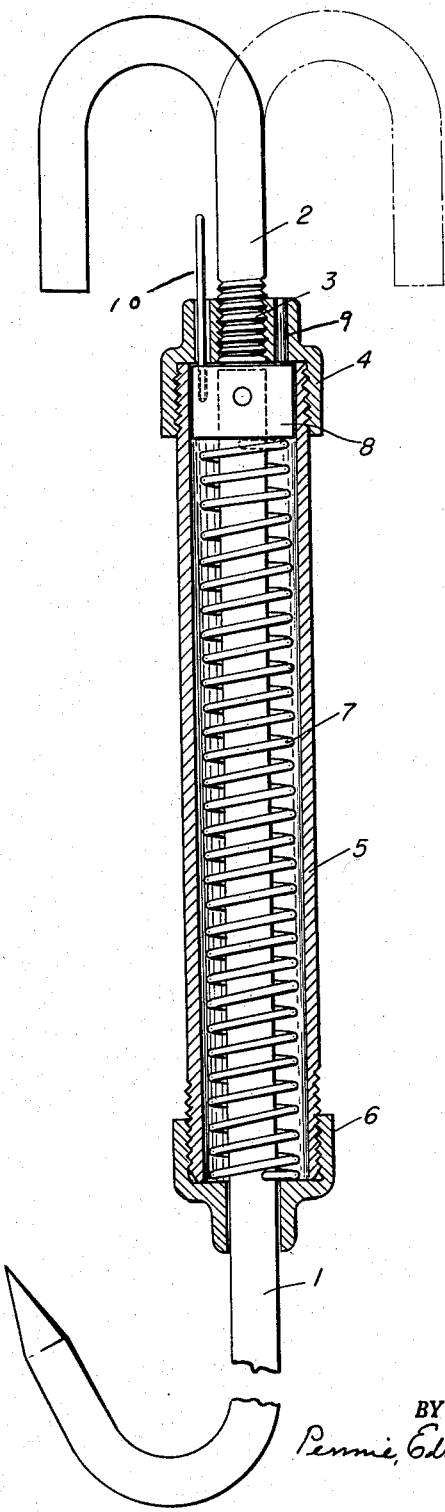

2,957,667

SPRING SUSPENSION HOOKS

Edwin Russell Kughler, 115–117 E. 129th St.,
New York, N.Y.

Filed Jan. 21, 1954, Ser. No. 405,462

1 Claim. (Cl. 248—119)

This invention relates to spring suspension hooks and has for its object to provide a hook of this type which is of rugged construction capable of sustaining a heavy load but which may nevertheless be made cheaply of standard parts without special machining.

A further object of the invention is to provide a hook of this class which is especially adapted for suspending beef carcasses in cars or trucks for transportation. In the transportation of beef carcasses it is customary to suspend the carcass from supports placed adjacent the roof of the car or truck upon pointed hooks which are thrust into the carcass. If the car or truck is subjected to unusually rough going, as may be occasioned by the road or road bed or by the necessity for short stops and the like, the weight of the carcass may cause it to tear loose from the hook and drop to the floor, resulting in damage to the carcass and substantial loss in value.

It has been found that the damage to suspended loads of this kind may be reduced by individual spring suspension hooks for each carcass, but as the weight to be suspended is substantial and the initial compression required for the spring is large, such hooks as heretofore designed have been of prohibitive manufacturing cost and therefore have not come into extensive use. By my invention a satisfactory spring suspension hook may be made up entirely of pipe fittings which may be selected of any size, depending upon the load to be carried and which can be readily assembled with ordinary tools and without special machines.

In the accompanying drawing I have illustrated my improved hook in vertical section.

Referring to the drawing, 1 indicates the hook such as customarily used for suspending the carcass and 2 indicates the upper portion of the hook to be suspended from the roof of the car or truck. As customarily made without the spring suspension feature the parts 1 and 2 are in one continuous piece. To utilize these hooks in the manufacture of spring suspension hooks the upper portion of the hook is cut off and threaded at the cut off end as indicated at 3, the thread being an ordinary pipe thread to which is attached a standard plumber's reducing coupling 4.

The large end of the coupling 4 is threaded onto a short section of galvanized pipe 5. A pipe of 1¼ inch diameter is of ample strength for the suspension of beef carcasses and large enough to enclose a compression spring 7 of a size to give the desired spring support.

The lower end of the pipe 5 is closed with a pipe fitting 6 similar to the pipe fitting 4. The threads in the smaller part of the pipe fitting 6 are preferably removed by a drill or otherwise so that the shaft of the hook 1 may slide freely back and forth.

The hooks 2 and 1 may be set to extend either in the same direction as shown in full lines in the drawing, or in opposite directions by turning the hook 2 to the dotted line position shown in the drawing. This adjustment is desirable to accommodate different spacing of the bars in the cars or storage warehouses where the meat is kept. To provide for this adjustment the pipe fitting 4 at the upper end of the part 5 has two holes 9 drilled through it to receive the pin 10 which is set in the upper face of the collar 8, as shown. Pin 10 is long enough for its end to project into the hole when the spring is compressed to the maximum extent for carrying the maximum expected load. It will be understood that the spring 7 is under sufficient initial compression when the parts are assembled to support the intended load with the collar 9 substantially at its uppermost position.

By this construction the hooks function as solid hooks so far as ordinary jars or vibrations are concerned, but when the car or truck is subjected to an unusual shock or jar the spring will give sufficiently to prevent the hook from tearing the carcass.

I claim:

A spring suspension hook comprising a casing consisting of a section of pipe threaded at both ends, a spring extending from end to end within said pipe, pipe fittings on the end of said pipe consisting of reducing couplings, a suspension hook threaded in one of said couplings, said hook comprising a laterally and downwardly extending portion, a movable hook having a shank extending into said casing through the coupling at the other end of said casing, said hook having laterally and upwardly extending portions, a collar secured to the end of the shank of said second mentioned hook, said collar overlying the upper end of said spring and a pin projecting upwardly from said collar, the adjacent coupling having a hole positioned to register with said pin when the two hooks project in the same lateral direction from the casing and a second hole positioned to register with said pin when the hooks project laterally in opposite directions from said casing, said pin being of a length such that the pin may be withdrawn from the holes in the cover by a downward pull on the loaded hook and the hook turned to a position for the pin to enter the other hole when relieved of the downward pull.

References Cited in the file of this patent

UNITED STATES PATENTS

| | | |
|---|---|---|
| 965,838 | Sanborn | July 26, 1910 |
| 1,253,595 | Hauser | Jan. 15, 1918 |
| 1,774,267 | Hanke | Aug. 26, 1930 |
| 2,589,726 | Neufeld | Mar. 18, 1952 |
| 2,707,610 | Fillion et al. | May 3, 1955 |

FOREIGN PATENTS

| | | |
|---|---|---|
| 967,115 | France | Mar. 22, 1950 |
| 535,823 | Great Britain | 1941 |
| 918,328 | France | Oct. 21, 1946 |